United States Patent

[11] 3,627,058

| | | |
|---|---|---|
| [72] | Inventor | Bruno Bernhardt Johannsen<br>Moline, Ill. |
| [21] | Appl. No. | 840,395 |
| [22] | Filed | July 9, 1969 |
| [45] | Patented | Dec. 14, 1971 |
| [73] | Assignee | Deere & Company<br>Moline, Ill. |

[54] TWO-WAY PLOW WITH AUTOMATIC LANDING
1 Claim, 3 Drawing Figs.

[52] U.S. Cl. .................................................. 172/206,
172/161, 172/446, 172/476, 172/667, 172/679
[51] Int. Cl. .................................................. A01b 3/42,
A01b 3/46, A01b 65/02
[50] Field of Search .................................................. 172/282,
283, 284, 285, 286, 287, 439, 440, 441, 442, 443,
204, 205, 206, 207, 208, 209, 210, 212, 213, 223,
224, 98, 216, 225, 226, 227, 232, 324, 605, 654,
656, 290, 291, 446, 449, 667, 679, 699, 739, 791,
324; 280/186, 456; 37/193

[56] References Cited
UNITED STATES PATENTS

| | | | |
|---|---|---|---|
| 2,625,089 | 1/1953 | Pursche ........................ | 172/206 |
| 3,158,205 | 11/1964 | Frager et al .................... | 172/677 |
| 3,481,406 | 12/1969 | Watts ............................ | 172/204 |
| 3,511,317 | 5/1970 | Richey ........................... | 172/212 |

OTHER REFERENCES

John Deere, Semi-Integral Moldboard Plows, Jan. 6, 1967,
1, 13- 4, F 135H and F 145H series Plow, Operators Manual
OM- A15642

*Primary Examiner*—Robert E. Pulfrey
*Assistant Examiner*—C. W. Hanor
*Attorneys*—H. Vincent Harsha, Harold M. Knoth, William A. Murray and John M. Nolan ABSTRACT: A semimounted rollover two-way plow having right- and left-hand plow bottoms rotatably mounted about a generally longitudinally extending tubular member, the tubular member being supported at its rear end by a steerable rear furrow wheel and at its front end by a transversely shiftable hitch crossbar. A pair of single-acting hydraulic cylinders rotate the plow bottoms between their alternate plowing positions while a first double-acting hydraulic cylinder sets the rear furrow wheel at alternate angular positions for right- and left-hand plowing so that the rear furrow wheel will be laterally offset from the centerline of the tractor and a second double-acting hydraulic cylinder sets the crossbar at alternate lateral positions for right- and left-hand plowing. The double-acting hydraulic cylinders are connected in parallel with each other and each of the single-acting cylinders is connected in parallel with one end of each of the double-acting cylinders so that when the plow bottoms are rotated between their alternate positions, the rear furrow wheel and hitch crossbar are simultaneously moved to their respective alternate positions.

Patented Dec. 14, 1971

INVENTOR.
BRUNO B. JOHANNSEN

Patented Dec. 14, 1971
3,627,058
2 Sheets-Sheet 2
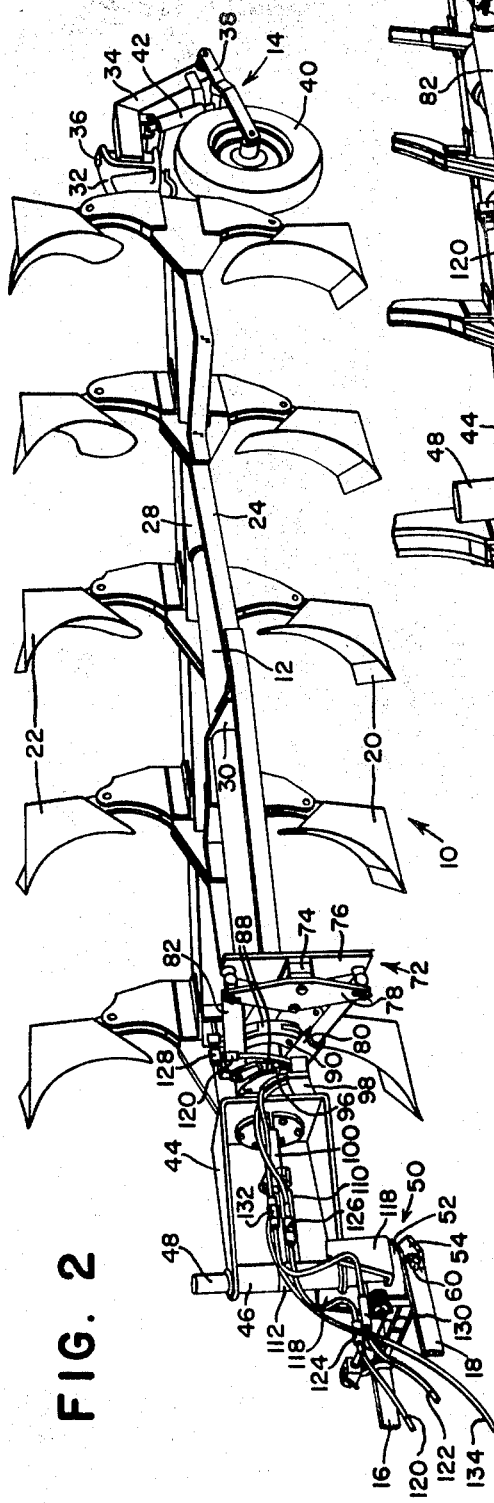
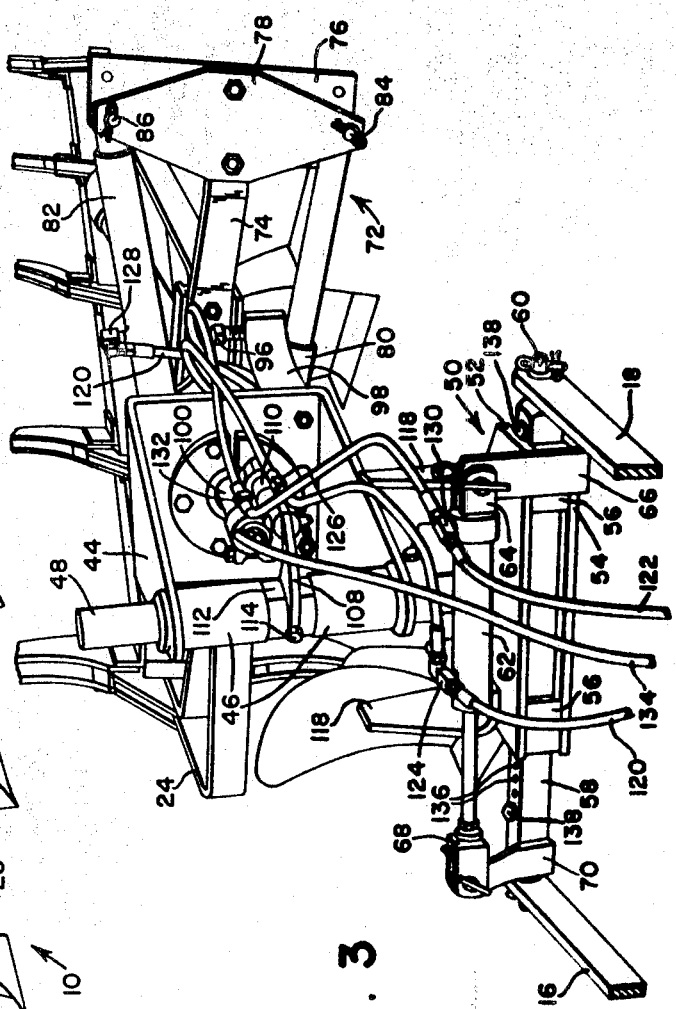
FIG. 2
FIG. 3
*INVENTOR.*
BRUNO B. JOHANNSEN

//  3,627,058

TWO-WAY PLOW WITH AUTOMATIC LANDING

BACKGROUND OF THE INVENTION

The present invention relates generally to agricultural implements, and more particularly relates to two-way plows.

When plowing, it is customary to make successive passes through a field, each pass being made closely adjacent to the land plowed during a preceding pass. In this manner, the furrow made during a preceding pass is filled by the earth displaced by the foremost plow bottom during the succeeding pass. To make sure that the previous furrow is properly filled, it is necessary to dispose the foremost plow bottom with the point of the plow bottom spaced from the furrow wall a distance equal to the cut of the plow bottom. For example, if a 16-inch bottom is being used, the point of the foremost plow bottom will be disposed 16 inches away from the adjacent furrow wall.

In order to locate the foremost plow bottom relative to the furrow left from the previous pass through the field, it has been generally common practice to drive the tractor with the wheel adjacent the plowed land disposed within the furrow. The wheel is adjusted so that it is disposed to the outside of the foremost plow bottom with the inner side of the wheel ahead of the outermost portion of the share. In addition to adjusting the wheel, or in the alternative to adjusting the wheel, the plow may be landed relative to the tractor. By landed, it is meant that the plow is shifted laterally relative to the tractor.

With many two-way plows, it has not been possible to run the rear tractor wheel in the previous furrow. The reason for this is that many of the modern plows are so large that if they are properly landed with respect to one of the rear tractor wheels when plowing in one direction, they will extend beyond the side of the tractor when indexed for plowing in the opposite direction. Thus, unless the operator of the tractor were to land the plow for each pass down a field, he had to run the tractor with all the wheels on unplowed land. When running the tractor with all the wheels on unplowed land, it is very difficult to maintain the foremost plow bottom the desired distance from the previous furrow with the precision desired.

SUMMARY OF THE INVENTION

It is an object of the present invention to provide means to automatically land a two-way plow in response to movement of the plow between its alternate plowing positions.

More particularly, it is an object of the present invention to provide a hydraulic landing device for a rollover two-way plow, the landing device being connected in parallel with the hydraulic rollover mechanism of the plow so that the plow is landed automatically in response to the plow bottoms being moved between their alternate plowing positions. Still another object of the present invention is to provide an automatic landing device for a rollover two-way plow which automatically lands the plow in response to movement of the plow bottom between their alternate plowing positions and which is simply adjusted to vary the extent of landing so that the plow can be used with tractors with various rear wheel settings.

The above and additional objects and advantages of the present invention will become apparent along with the details of construction of a preferred embodiment of invention from a reading of the following detailed description when taken in conjunction with the accompanying drawings.

BRIEF DESCRIPTION OF THE DRAWINGS

In the drawings:

FIG. 2 is a perspective view of the plow illustrated in FIG. 1; and

FIG. 3 is an enlarged perspective view of the forward portion of the plow illustrated in FIG. 1.

DESCRIPTION OF THE PREFERRED EMBODIMENT

Figure 1:
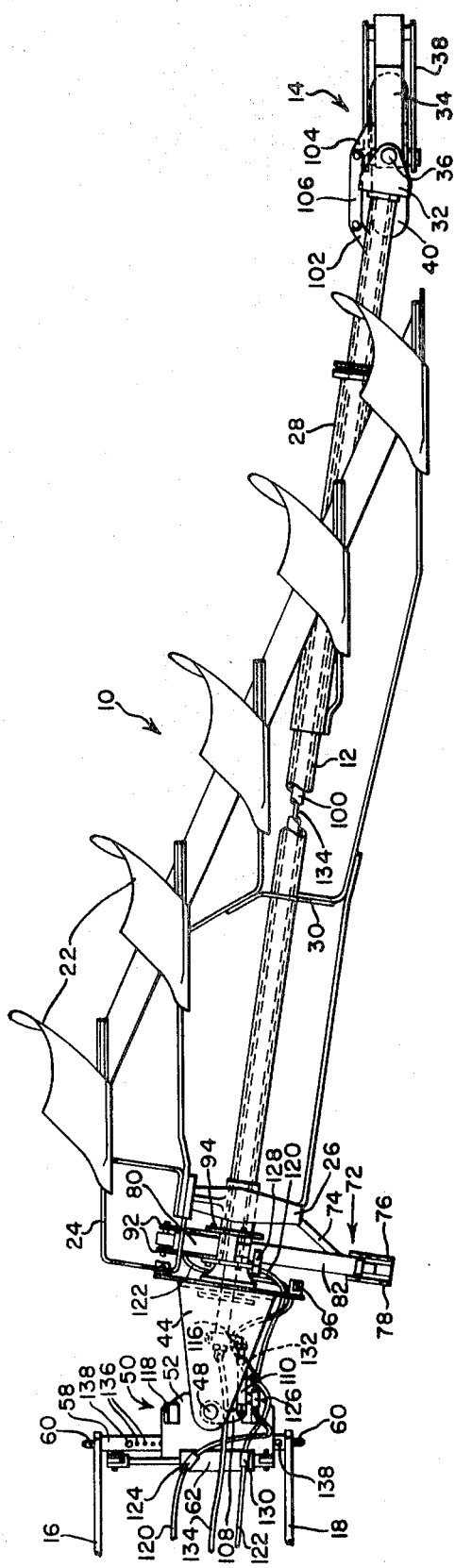
FIG. 1 is a top plan view of a plow employing an automatic landing device according to the present invention.

Referring now to the drawings, the plow is indicated generally at 10 and includes a nonrotatable main tube 12 about which a plurality of right- and left-hand plow bottoms are adapted to be rotated between right- and left-hand plowing positions. The main tube 12 is supported at its rear end by a rear furrow wheel assembly indicated generally at 14 and at its forward end by a tractor having right- and left-hand lower draft links 16 and 18 respectively.

The right-hand plow bottoms 20 and left-hand plow bottoms 22 are carried by a frame 24 which is rotatably mounted on the main tube 12. Near its forward end, the frame 24 is provided with a crossbeam 26 which is rotatably mounted on the main tube 12, and at its rear end the frame 24 extends diagonally across the main tube 12 and includes an elongated generally longitudinally extending tube 28 which is rotatably mounted on the main tube 12. The frame 24 further includes an intermediate crossbar 30 which is also rotatably mounted on the main tube 12.

The furrow wheel assembly 14 is mounted on the main tube 12 by a bracket 32 which has a pair of vertically spaced rearwardly extending ears. The bracket 32 is secured to the rear end portion of the tube 12 in any suitable manner. The forward end of a furrow wheel support member 34 is pivotally mounted between the spaced ears of the bracket 32 by a pivot pin 36. The furrow wheel support member 34 includes a generally horizontal rearwardly extending portion and a downwardly and rearwardly extending portion. A fork member 38 is pivotally secured to the lower rearward portion of the support member 34 and extends forwardly thereof. A furrow wheel 40 is rotatably journaled between the legs of the fork member 38. The rear portion of the plow is raised and lowered on the furrow wheel 40 by a single-acting extensible and retractable hydraulic cylinder 42 which extends between and is operatively connected to the horizontal portion of the supporting member 34 and the fork member 38.

The forward end of the main tube 12 is rigidly secured to the bight portion of a generally U-shaped pivot bracket 44. The legs of the U-shaped pivot bracket 44 extend forwardly and are provided with upper and lower bearing blocks 46. The bearing blocks 46 rotatably receive a vertical pivot shaft 48 which is an integral part of a hitch frame indicated generally at 50.

The hitch frame 50 includes a pair of vertically spaced, generally horizontal plates 52 and 54 which are integral with and carry the pivot post 48. Spacers 56 positioned between the hitch plates 52 and 54 form a transversely extending channel which slidably receives a hitch crossbar 58. The opposite ends of the hitch crossbar 58 are provided with integral pins 60 which extend through apertures provided in the rear ends of the draft links 16 and 18. The plow 10 can be landed or shifted laterally relative to the draft links 16 and 18 by movement of the hitch crossbar 58 within the channel formed by the hitch plates 52, 54 and the spacers 56. Movement of the crossbar 58 within the channel is controlled by a double-acting hydraulic cylinder 62 which has its anchor end 64 secured to a bracket 66 mounted on the hitch plates 52 and 54 and its rod end 68 secured to a bracket 70 integrally mounted on one end of the crossbar 58.

An indexing mechanism for rotating the frame 24 between right- and left-hand plowing positions is indicated generally at 72 and includes an outwardly extending arm 74 secured to the crossbeam 26. A pair of plates 76 and 78 are secured intermediate their ends to opposite sides of the outer end of the arm 74. The rod ends of right- and left-hand rollover cylinders 80 and 82 are pivotally mounted between the opposite ends of the plates 76 and 78 by pivot pins 84 and 86 respectively. As best seen in FIG. 2, the anchor end of the left-hand cylinder 82 is pivotally mounted between the ends of a pair of links 88 which have their opposite ends pivotally mounted as at 90 to a pair of ears provided on a lower left-hand portion of the main tube 12. As best illustrated in FIG. 1, the anchor end of the right-hand cylinder 80 is pivotally mounted between the ends of a pair of links 92 which have their opposite ends pivotally mounted as at 94 to a pair of ears provided on a lower right-hand portion of the main tube 12. From the above, it can be seen that extension of the left-hand cylinder 82 will cause the frame 24 to rotate from the right-hand position illustrated to a left-hand position, and extension of the right-hand cylinder 80 will return the frame 24 to its right-hand position. The frame 24 can be leveled in either the right- or left-hand position by adjusting screws 96 provided on arms 98 extending from opposite sides of the bight portion of pivot bracket 44.

For the purpose of steering the rear furrow wheel 40 when the plow pivots about the post 48, a means is provided for interconnecting the furrow wheel assembly 14 with the pivot post 48 and includes a hollow tubular member 100 disposed within the main tube 12 for relative sliding movement. The rear end of the main tube 12 is longitudinally apertured on one side and the tubular member 100 is provided with a laterally, outwardly projecting lug 102 which extends through the aperture. An outwardly projecting steering arm or torque transmitting member 104 is carried by the supporting member 38 and is interconnected with the lug 102 by a link 106. The forward end of the steering tube 100 is connected to a crank arm 108 by a double-acting hydraulic steering cylinder 110. The crank arm 108 is integrally formed with a sleeve 112 which is mounted on the pivot post 48 between the bearing blocks 46 and is held rigid with the pivot post 48 by pin 114. The anchor end of the cylinder 110 is pivotally secured to the crank arm 108 and the rod end of the cylinder 110 is pivotally secured to a laterally extending arm 116 on the forward portion of the steering tube 100. The steering linkage 112, 110, 100, 102, 106 and 104 serves to turn the furrow wheel 40 in a direction opposite from that which the tractor is turned to thereby reduce the area required to turn the tractor and plow around. Excessive turning movement of the plow relative to the tractor is prevented by stops 118 which are mounted on the upper hitch plate 52 and will contact the lower leg of the U-shaped pivot bracket 44 to limit relative movement between the tractor and plow.

It should be noted that when the plow is in the right-hand plowing position as illustrated in the drawings, the steering cylinder 110 is retracted and the furrow wheel 40 is laterally offset to the left side of the centerline of the tractor and extends straight ahead. When the plow is indexed for left-hand plowing, the steering cylinder 110 will be extended and the furrow wheel 40 will be offset to the right-hand side of the tractor centerline and will extend straight ahead.

The landing cylinder 62, steering cylinder 110, and rollover cylinders 80 and 82 are all connected in parallel. To this end, a pair of fluid lines 120 and 122 are provided. The fluid line 120 is connected to the rod end of cylinder 62 by tee coupling 124, is connected to the anchor end of the steering cylinder 110 by tee coupling 126, and is also connected to the anchor end of the left-hand rollover cylinder 82 by coupling 128. The fluid line 122 is connected to the anchor end of the landing cylinder 62 by tee coupling 130, to the rod end of the steering cylinder 110 by tee coupling 132, and also to the rod end of the right-hand rollover cylinder 80. The forward ends of the fluid lines 120 and 122 are adapted to be connected to the conventional remote cylinder outlets provided on the propelling tractor. When fluid pressure is applied to the fluid line 120 and exhausted from the fluid line 122, the plow will be landed to the right by contraction of the landing cylinder 62, the rear furrow wheel 40 will be set for left-hand plowing by extension of the steering cylinder 110, and the plow bottom will be indexed for left-hand plowing by extension of the rollover cylinder 82. When fluid pressure is applied to the fluid line 122 and exhausted from the fluid line 120, the plow will be returned to the position illustrated in the drawings for right-hand plowing.

Before indexing the plow for right- or left-hand plowing, it is necessary to raise the plow bottoms out of the ground. This is accomplished by raising the forward end of the plow by vertical movement of the draft links 16 and 18 and by raising the rear end of the plow by extension of the hydraulic cylinder 42. For the purpose of extending the hydraulic cylinder 42, a fluid line 134 is provided. The fluid line 134 extends through the hollow steering tube 100 and has its opposite ends connected to the anchor end of the single-acting cylinder 42 and to an additional conventional remote cylinder outlet on the propelling tractor.

In order that the plow 10 can be used with tractors with various wheel settings, the crossbar 58 is provided with a plurality of vertically extending apertures 136, and a pair of pins 138 are provided to extend through a selected aperture on each end of the crossbar 58. By placing the pins 138 into the apertures 136, the extent of movement of the crossbar 58 relative to the hitch plates 52 and 54 is varied. For example, when the pins 138 are placed in the extreme outer apertures, the cylinder 62 will properly land the plow for a tractor having 33-inch-wheel settings. That is, a tractor in which the inside edge of each of the outer wheels is positioned 33 inches from the centerline of the tractor. When the pins 138 are placed in the second apertures from the outer ends of the crossbar, the cylinder 62 will properly land the plow for use with a tractor having a 34-inch rear wheel setting.

From the foregoing, it can be seen that the present invention provides a hydraulic landing device for use with a rollover two-way plow which will automatically land the plow in response to movement of the plow bottoms between their alternate plowing positions, and which is easily adjusted for use with tractors of different wheel settings.

While a single preferred embodiment of the invention has been described and illustrated, various modifications within the underlying principles of the invention will be obvious to those skilled in the art and can be made without departing from the spirit and scope of the invention.

I claim:

1. A semimounted two-way plow for use with a tractor having a source of fluid pressure, a fluid reservoir, and a pair of draft links movable through a vertical range, the plow comprising: a nonrotatable main frame; a hitch frame; means supporting the main frame on the hitch frame for relative lateral swinging movement about a first generally upright axis; an elongated hitch crossbar; means mounting the hitch frame on the hitch crossbar for relative sliding movement in the direction of the longitudinal axis of the hitch crossbar between alternate right- and left-hand plowing positions; the hitch crossbar including means on its opposite ends for attachment to the tractor draft links to support the hitch frame and the forward end of the main frame on the tractor draft links for vertical movement therewith; a first double-acting extensible and retractable hydraulic cylinder means having opposite ends connected to the hitch crossbar and hitch frame to move the hitch frame to its alternate plowing positions with respect to the hitch crossbar upon extension and retraction; rear wheel means secured to and supporting the rear end of the main frame and being swingable about a second generally upright axis between alternate right- and left-hand plowing positions; a second double-acting extensible and retractable hydraulic cylinder means operatively connected between the hitch frame and the rear wheel means to swing the rear wheel means between its alternate plowing positions with respect to the main frame upon extension and retraction; a secondary frame carrying a plurality of right- and left-hand plow bottoms mounted on the main frame for rotational movement between alternate right- and left-hand plowing positions; a pair of single-acting extensible and retractable hydraulic cylinders operatively connected between the main frame and the secondary frame and each being operable to rotate the secondary frame to one of its alternate positions when moved in one direction; first fluid line means connected to one end of each of the first and second double-acting hydraulic cylinders and to one of the pair of single-acting hydraulic cylinders; second fluid line means connected to the opposite end of each of the first and second double-acting hydraulic cylinders and to the second of the pair of single-acting hydraulic cylinders; and means to selectively and alternately connect the first and second fluid line means to the source of fluid pressure and fluid reservoir whereby the main frame is shifted laterally with respect to the hitch crossbar as the secondary frame is moved from one of its plowing positions to the other.

* * * * *